(12) United States Patent
Dhruv et al.

(10) Patent No.: US 8,053,548 B2
(45) Date of Patent: Nov. 8, 2011

(54) HYDROPHILIC SURFACE MODIFICATION OF POLYDIMETHYLSILOXANE

(75) Inventors: Harshil Dhruv, Tempe, AZ (US); David Britt, Mendon, UT (US)

(73) Assignee: Utah State University, North Logan, UT (US)

( * ) Notice: Subject to any disclaimer, the term of this patent is extended or adjusted under 35 U.S.C. 154(b) by 39 days.

(21) Appl. No.: 12/551,722

(22) Filed: Sep. 1, 2009

(65) Prior Publication Data

US 2010/0063237 A1    Mar. 11, 2010

Related U.S. Application Data

(60) Provisional application No. 61/094,510, filed on Sep. 5, 2008.

(51) Int. Cl.
*C08G 75/02* (2006.01)
(52) U.S. Cl. ............ 528/481; 528/31; 528/32; 524/268; 524/588; 525/477; 525/478

(58) Field of Classification Search .................... 528/32, 528/23
See application file for complete search history.

(56) References Cited

U.S. PATENT DOCUMENTS

2009/0316417 A1*  12/2009  Chari et al. .................. 362/326

OTHER PUBLICATIONS

Dow Corning Corporation MSDS for SYLGARD 184 Silicone Elastomer Base and SYLGARD 184 Silicone Elastomer Curing Agent, DOW Corning Corporation, 2005.*

* cited by examiner

*Primary Examiner* — Marc Zimmer
*Assistant Examiner* — Lindsay Nelson

(57) ABSTRACT

A method for the preparation of hydrophilic elastomers involves the synthesis of polydimethylsiloxane with tunable hydrophilic surface properties. An elastomeric monolith with desired hydrophilic properties is produced by combining a polyethylene oxide polymeric surfactant additive with a PDMS base and curing agent during polymerization. The surfactant chain segment lengths are varied to control the hydrophobic/hydrophilic balance.

2 Claims, 3 Drawing Sheets

HYDROPHILIC SURFACE MODIFICATION OF POLYDIMETHYLSILOXANE

RELATED APPLICATIONS

This application claims the benefit of U.S. Provisional Patent Application Ser. No. 61/094,510 filed on Sep. 5, 2008 the contents of which are hereby incorporated by reference.

FIELD OF THE INVENTION

This invention relates to a method for the preparation of hydrophilic elastomers, and in particular to the synthesis of polydimethylsiloxane with tunable hydrophilic surface properties.

BACKGROUND OF THE INVENTION

Polydimethylsiloxane (PDMS) is a silicon based organic polymer that is inert and non-toxic. The mechanical, chemical, and optical properties of PDMS make it a material used in a range of medical related applications, such as artificial organs, prostheses, catheters, contact lenses, and drug delivery systems. Non medical applications include microfluidic devices, microreactors, lab on chip diagnostics, soft-lithography, membranes, electrical insulators, water repellents, anti foaming agents, adhesives, protective coatings, sealants, and a wide variety of other uses.

PDMS is commercially available from several vendors as a two part kit consisting of an elastomer base and a cross linking agent, both in liquid form. A range of kits are available in which elastomer base molecular weight and/or branching are varied. Polymerization is initiated upon mixing the elastomer base with the cross-linking agent, producing an optically clear rubbery solid PDMS elastomer with hydrophobic surface characteristics. The hydrophobic nature of PDMS is often an undesirable property for various applications stated previously. In particular, microfluidic devices may require hydrophilic surfaces to permit polar liquids to pass through. Biomedical devices, such as contact lenses, that are easily wetted improve user comfort. A variety of strategies have been developed to render the PDMS surface hydrophilic, which include exposure to oxygen plasma, ozone, corona discharge, and ultraviolet light. In addition hydrophilic surface modification has been achieved through physical adsorption of charged surfactants, polyelectrolyte multilayers, and entangling amphiphilic co-polymers using a swelling-deswelling method in organic solvent. Covalent modification of the PDMS surface requires activation of the surface, generally through an oxidative process followed by deposition of the reactive molecule from solvent or chemical vapor deposition. Some of the most widely used methods for production of hydrophilic PDMS are described briefly below. Cost effective methods to render PDMS hydrophilic that do not compromise mechanical, optical, or gas permeability properties are of the essence.

It is well established in the literature that exposing PDMS to various energy sources can alter its surface properties. Energy sources such as oxygen plasma, ultraviolet light, and corona discharges have been used to create hydrophilic PDMS surface by oxidation. Oxygen plasma and ultraviolet light have been the most widely used methods in modifying PDMS surfaces. However, these methods generate an unstable and brittle hydrophilic glass like silicate surface layer that compromises elasticity and is unstable over time, allowing the PDMS surface to recover its hydrophobic nature.

Chemical grafting of hydrophilic molecules to the surface of PDMS is stable but is difficult to achieve because PDMS is chemically inert. Thus the first step is to render the surface reactive through exposure to an oxygen plasma or other energy source as discussed previously, resulting in a glass-like silicate layer with chemically reactive groups (e.g. hydroxyl groups: —OH) on the surface. Additional surface modification is achieved via chemical coupling of target molecules to the —OH (or other reactive groups) following standard protocols. However, the underlying glass-like layer remains brittle, limiting applications where elasticity is required, and the process requires multiple reaction steps, which can be costly, inefficient, and generate waste in the form of organic solvent.

Physical entanglement of amphiphilic copolymers containing a PDMS chain to serve as an anchor group is achieved via a swelling-deswelling method. In this approach, a cross-linked PDMS monolith is placed in an organic solvent, such as choloroform, resulting in swelling. In the swollen state low molecular weight amphipilic copolymers may penetrate the PDMS surface. Exchanging the solvent for a polar solvent returns the PDMS monolith to its original size. The aim is to embed/anchor the amphiphilic copolymers on the surface of a cross-linked PDMS. Copolymers that may penetrate the surface of the swollen PDMS monolith are likely held in place by van der Waals force and hydrophobic interactions between the PDMS monolith and PDMS segments in block copolymer amphiphiles. The aim is produce a stable hydrophilic surface on PDMS. However, this method is very time consuming and requires an organic solvent such as chloroform to sufficiently swell the PDMS.

From a review of the current literature, there is a need for a simple and cost efficient technique to form a silicon elastomer, namely, polydimethylsiloxane exhibiting hydrophilic character that can be tuned by the preparation conditions and subsequent treatments and exposure environments.

SUMMARY OF THE INVENTION

The addition of select surfactants to a commercial PDMS base and curing agent mixture produces PDMS with a hydrophilic surface. Applicable surfactants, such as a polymeric surfactant can be an amphiphilic block copolymer or an end functionalized polymer. This polymeric surfactant additive may be a linear or branched polymer. It is comprised of a hydrophobic segment, or anchor, which is compatible with the base elastomer (e.g. PDMS) and serves to solubilize the additive within the elastomer matrix during prepartion, and later serves to anchor the additive in the cured PDMS. The additive is also comprised of a hydrophilic pendant chain(s), which impart(s) desirable surface properties to the formed elastomer monolith, where van der Waals forces and hydrophobic interactions between the PDMS base polymer and polymeric surfactant additive are sufficient to lead to a stable hydrophilic surface. Further, the extent of surface modification of PDMS monoliths may be tuned by varying the molecular weight of the polymeric surfactant additive and/or the ratio and/or configuration of hydrophobic anchor to hydrophilic pendant chain(s). In addition to modifying the surface energy of the PDMS monolith, the optical properties of the formed PDMS monoliths can be tuned by varying factors such as the concentration, molecular weight, configuration, and hydrophobic/hydrophilic balance of the polymer additive(s).

BRIEF DESCRIPTION OF THE DRAWINGS

Understanding that drawings depict only certain preferred embodiments of the invention and are therefore not to be

DETAILED DESCRIPTION OF SELECTED EMBODIMENTS

Figure 1:
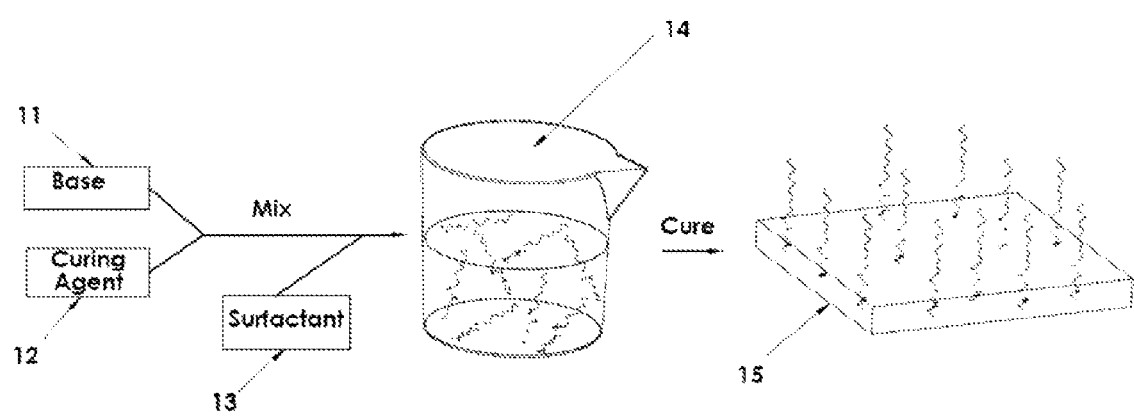
FIG. 1 shows the process steps for one embodiment of the hydrophilic PDMS preparation method.

In the following description, numerous specific details are provided for a thorough understanding of specific preferred embodiments. However, those skilled in the art will recognize that embodiments can be practiced without one or more of the specific details, or with other methods, components, materials, etc. In some cases, well-known structures, materials, or operations are not shown or described in detail in order to avoid obscuring aspects of the preferred embodiments. Furthermore, the described features, structures, or characteristics may be combined in any suitable manner in a variety of alternative embodiments. Thus, the following more detailed description of the embodiments of the present invention, as represented in the drawings, is not intended to limit the scope of the invention, but is merely representative of the various embodiments of the invention.

Referring to FIG. 1, a PDMS polymer base 11 is mixed with a curing agent 12 and a surfactant 13 added. The base 11 comprises 30 to 60 weight percent dimethylvinylated and trimethylated silica, 1 to 5 weight percent tetra(trimethylsiloxy)silane, and balance dimethyl siloxane, dimethylvinyl-terminated. The curing agent 12 comprises 40 to 70 weight percent dimethyl methylhydrogen siloxane, 15 to 40 weight percent dimethyl siloxane dimethylvinyl-terminated, 10 to 30 weight percent dimethylvinylated and trimethylated silica, and 1 to 5 weight percent tetramethyl tetravinyl cyclotetrasiloxane. The mixture 14 is stored at the appropriate temperature for a period of time and then cured to produce a modified PDMS elastomeric monolith 15 with desired hydrophilic properties. In one embodiment a polyethylene oxide, PEO) polymeric surfactant additive having the following general formula

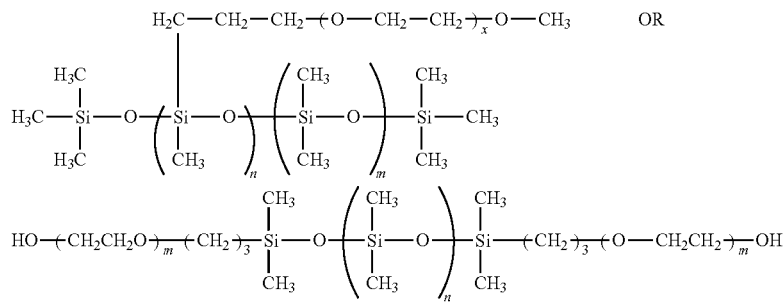

is combined with the PDMS base and curing agent during polymerization. The subscripts, x, n, m, defining chain segment lengths are varied to control the hydrophobic/hydrophilic balance and degree of modification of the PDMS monolith. The value of x may range from 8 to 35, n from 1 to 7, and m from 1 to 7 for the first molecule presented above. For the second molecule m equals 1 and n ranges from 6 to 8. Mixing ratios of 10:1:(0.1 to 0.5) (PDMS base:curing agent: polymeric surfactant additive) have been successfully employed. The mixture is allowed to stand at temperatures $\leqq 4°$ C. for 12-18 hrs for removing the air bubbles and to allow the low molecular weight surfactant to segregate to the surface which imparts hydrophilic surface properties to the PDMS. The low temperature slows the polymerization process which allows enough time for surface segregation. In specific embodiments, centrifugation and vacuums are also employed to remove entrapped air. Afterwards the mixture is heated to temperatures $\geqq 60°$ C. to facilitate cross-linking and formation of the hydrophilic PDMS monolith.

While the mixing ratios of 10:1:(0.1 to 0.5) (PDMS base: curing agent:polymeric surfactant additive) may be desired for specific properties, the ratio may be varied from one to twenty to achieve different degrees of elasticity in the PDMS.

Here, van der Waals force and hydrophobic interactions between the PDMS monolith and PDMS segments in polymeric surfactant additives stabilize the surfactant at the polymer surface, resulting in a hydrophilic coating. The surface fraction of PEO on the PDMS surface is controlled by the cross-linking density of the PDMS matrix and concentration, geometry and hydrophilic-lipophilic balance (HLB) of PEO containing polymeric surfactant additives used in the modification procedure. Further, optical properties of the formed PDMS monoliths are controlled through the concentration of polymeric surfactant additive and PEO fraction of the polymeric surfactant additive used.

Applicable surfactants, such as a polymeric surfactant can be an amphiphilic block copolymer or an end functionalized polymer. This polymeric surfactant additive may be a linear or branched polymer. It is comprised of a hydrophobic segment, or anchor, which is compatible with the base elastomer (e.g. PDMS) and serves to solubilize the additive within the elastomer matrix during prepartion, and later serves to anchor the additive in the cured PDMS. The additive is also comprised of a hydrophilic pendant chain(s), which impart(s) desirable surface properties to the formed elastomer monolith, where van der Waals forces and hydrophobic interactions between the PDMS base polymer and polymeric surfactant additive are sufficient to lead to a stable hydrophilic surface.

Figure 2A:
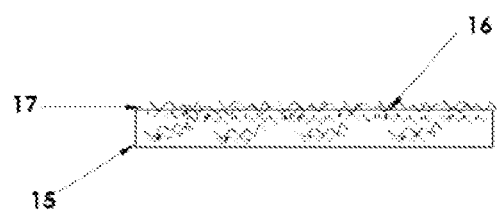
FIGS. 2a, 2b, and 2c are schematic illustrations of the time dependent water contact angle behavior of the modified PDMS.
Figure 2B:
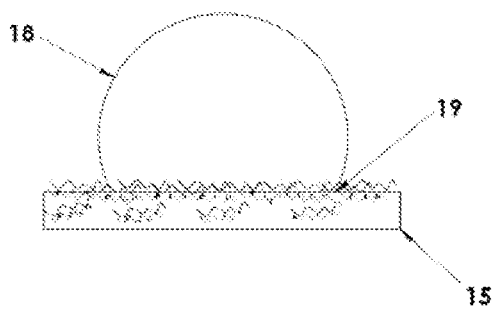
Figure 2C:
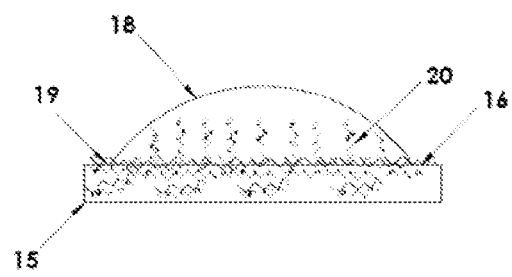

A key determinant factor for diffusion and surface segregation of the polymeric surfactant additive is the entanglement molecular weight of the PDMS matrix, which is dependent on the cross-linking ratio, and molecular weight of the polymeric surfactant additive used. The effectiveness of the polymeric surfactant to impart the desired hydrophilicity depends on molecular weight, geometry and HLB of the particular surfactant. The optical properties also depend on the fraction of PEO segment present in the polymeric surfactant with a higher PEO fraction correlating to a lower transparency of the synthesized PDMS monolith. The stability of the hydrophilic character of the PDMS monolith synthesized by this process is dependent upon the environment in which the synthesized samples are stored and the solubility of the polymeric surfactant in the surrounding environment FIGS. 2a, 2b, and 2c are schematic illustrations of the time dependent water contact angle behavior of the modified PDMS. FIG. 2a shows the modified PDMS elastomeric monolith 15 with a surface segregated surfactant 16 at the polymer/air interface 17, resulting in the minimization of the interfacial free energy. FIG. 2b represents the instant at which the modified PDMS elastomeric monolith 15 comes in contact with a water droplet 18 and a polymer/water interface 19 is formed. The system exhibits hydrophobic behavior at this moment. FIG. 2c shows the water droplet 18 on the modified PDMA elastomeric monolith 15 after a period of time. The surfactant 16 is adsorbed and reorients 20 towards the polymer/water interface 19. This acts to minimize the interfacial free energy and reduces the water contact angle, thus producing a hydrophilic surface.

Figure 3:
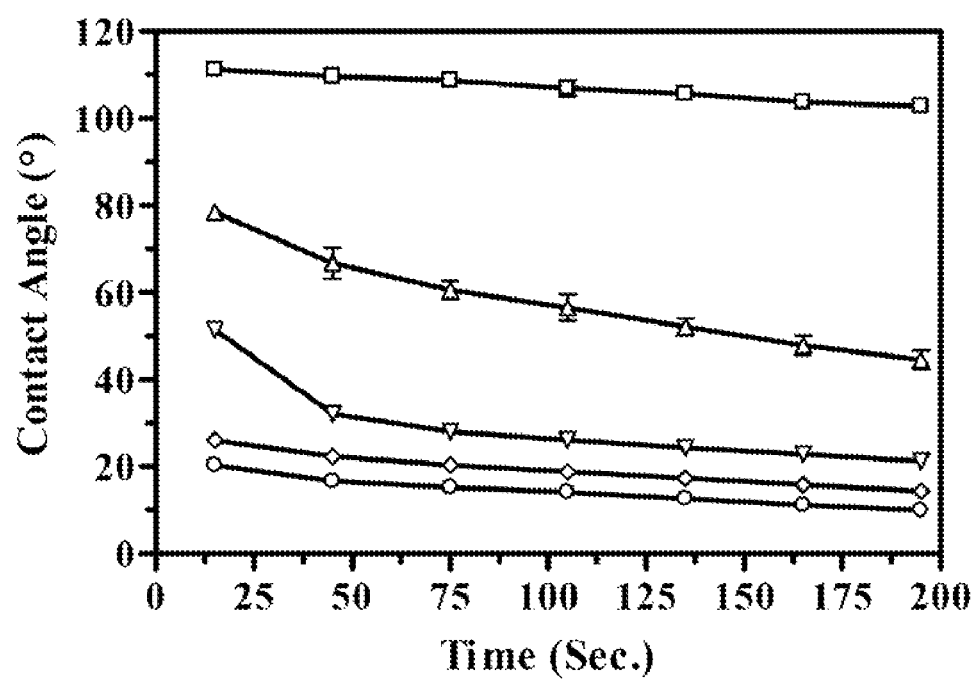
FIG. 3 shows the temporal variation in water contact angle behavior on modified PDMS surfaces exhibiting hydrophilic characteristics. The surfactant additions are 0=squares, 1%=up triangles, 2%=down triangles, 3%=diamonds, and 5%=circles.

FIG. 3 shows is a graph of experimental data showing the surface becoming more hydrophilic with time for a constant amount of surfactant added. FIG. 3 also shows that for a constant time, the hydrophilic nature of the modified PDMS increases with increasing amount of surfactant.

Inherent to this invention is that the partitioning of surfactant additive to the PDMS surface during curing is further controlled by defining the properties of the interface, whether it be polymer/solid, polymer/gas, or polymer/liquid. The solid surface may represent a mold or template for forming a contact lens or microfluidic chip or microcontact stamp, as representitive but not exclusive examples. Modification of these surfaces with said polymer additives (surfactants) prior to addition of the elastomer/base mixture is also covered by this invention.

The invention claimed is:

1. A process for synthesizing hydrophilic polydimethylsiloxane elastomer comprising:
    mixing a base comprising 30 to 60 weight percent dimethylvinylated and trimethylated silica, 1 to 5 weight percent tetra(trimethylsiloxy)silane, and balance dimethyl siloxane, dimethylvinyl-terminated;
    with a curing agent comprising 40 to 70 weight percent dimethyl methylhydrogen siloxane, 15 to 40 weight percent dimethyl siloxane dimethylvinyl-terminated, 10 to 30 weight percent dimethylvinylated and trimethylated silica, and 1 to 5 weight percent tetramethyl tetravinyl cyclotetrasiloxane;
    adding a polymeric surfactant;
    cooling the mixture to a prescribed temperature for a period of time to allow surface segregation of said polymeric surfactant additive; and
    curing the mixture at an elevated temperature for a period of time.

2. The process of claim 1, further comprising the volume ratio to be within the range of one to twenty parts said base to one part said curing agent to attain the desired entanglement molecular weight of the polydimethylsiloxane matrix and accordingly desired surface segregation of said polymeric surfactant of different molecular weights.

* * * * *